United States Patent
Yamamoto et al.

(10) Patent No.: US 11,393,128 B2
(45) Date of Patent: Jul. 19, 2022

(54) ADHERED SUBSTANCE DETECTION APPARATUS

(71) Applicant: DENSO TEN Limited, Kobe (JP)

(72) Inventors: Daisuke Yamamoto, Kobe (JP); Nobunori Asayama, Kobe (JP); Nobuhisa Ikeda, Kobe (JP); Yasushi Tani, Kobe (JP); Takashi Kono, Kobe (JP); Daisuke Shiota, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 181 days.

(21) Appl. No.: 17/017,846

(22) Filed: Sep. 11, 2020

(65) Prior Publication Data

US 2021/0090297 A1     Mar. 25, 2021

(30) Foreign Application Priority Data

Sep. 20, 2019    (JP) .............................. JP2019-172211

(51) Int. Cl.
     *G06T 7/80*      (2017.01)
     *G06T 7/13*      (2017.01)
     *G01N 21/958*      (2006.01)

(52) U.S. Cl.
     CPC .............. *G06T 7/80* (2017.01); *G01N 21/958* (2013.01); *G06T 7/13* (2017.01); *G01N 2021/9583* (2013.01); *G06T 2207/10024* (2013.01)

(58) Field of Classification Search
CPC ... G06T 7/80; G06T 7/13; G06T 2207/10024; G06T 2207/20021; G06T 2207/30248; G06T 7/0002; G01N 21/958; G01N 2021/9583; G01N 21/94
See application file for complete search history.

(56) References Cited

U.S. PATENT DOCUMENTS

| | | | |
|---|---|---|---|
| 10,970,585 B2* | 4/2021 | Ikeda | G06T 7/0004 |
| 2016/0307054 A1* | 10/2016 | Takemura | G06V 20/56 |
| 2018/0114089 A1* | 4/2018 | Ikeda | G06V 10/751 |
| 2019/0041849 A1* | 2/2019 | Kida | B60W 30/00 |
| 2020/0210747 A1* | 7/2020 | Ikeda | G06V 20/56 |
| 2020/0211171 A1* | 7/2020 | Ikeda | G06T 7/13 |

FOREIGN PATENT DOCUMENTS

| | | |
|---|---|---|
| JP | 2012-038048 A | 2/2012 |
| JP | 2018-072312 A | 5/2018 |

* cited by examiner

*Primary Examiner* — Emily C Terrell
*Assistant Examiner* — Molly Wilburn
(74) *Attorney, Agent, or Firm* — Oliff PLC

(57) ABSTRACT

An adhered substance detection apparatus of an embodiment includes a calculator and a determiner. The calculator calculates an edge feature for each cell based on edge vectors of pixels within the cell in a captured image, and further calculates a region feature for each unit region based on the calculated edge features of the cells within the unit region. The determiner determines an adherence state of an adhered substance on a lens of a camera based on the region feature. The calculator calculates, as the region feature, number of the cells having an edge strength of zero. When the number of the cells having the zero edge strength is equal to or greater than a predetermined number in a predetermined attention area in the captured image, the determiner determines not to perform a determination for detecting whether the lens of the camera is entirely covered by the adhered substance.

4 Claims, 15 Drawing Sheets

AVERAGE LUMINANCE VALUE OF ROI_D IS
GREATER THAN AVERAGE LUMINANCE VALUE OF ROI_U
BY PREDETERMINED VALUE OR GREATER

DETERMINE THAT LENS IS NOT IN ENTIRELY-COVERED STATE

ADHERED SUBSTANCE DETECTION APPARATUS

BACKGROUND OF THE INVENTION

Field of the Invention

The invention relates to an adhered substance detection apparatus and an adhered substance detection method.

Description of the Background Art

Conventionally, there has been known an adhered substance detection apparatus that detects an adhered substance adhered to a lens of a camera based on a captured image captured by the camera mounted on a vehicle or the like. The adhered substance detection apparatus detects the adhered substance, for example, based on a difference between time-series captured images.

However, as for a conventional technology, accuracy in detecting an adhered substance further needs to be improved.

SUMMARY OF THE INVENTION

According to one aspect of the invention, an adhered substance detection apparatus includes a calculator and a determiner. The calculator calculates an edge feature for each cell based on edge vectors of pixels within the cell. The cell consists of a predetermined number of the pixels in a captured image. The calculator further calculates a region feature for each unit region based on the calculated edge features of the cells within the unit region. The unit region is a predetermined region and consists of a predetermined number of the cells. The determiner determines an adherence state of an adhered substance on a lens of a camera based on the region feature. The calculator calculates, as the region feature, number of the cells having an edge strength of zero. The edge strength is a part of the edge feature. When the number of the cells having the zero edge strength is equal to or greater than a predetermined number in a predetermined attention area in the captured image, the determiner determines not to perform a determination for detecting whether or not the lens of the camera is in an entirely-covered state in which the lens of the camera is entirely covered by the adhered substance.

An object of the invention is to provide an adhered substance detection apparatus and an adhered substance detection method capable of improving accuracy in detecting an adhered substance.

These and other objects, features, aspects and advantages of the invention will become more apparent from the following detailed description of the invention when taken in conjunction with the accompanying drawings.

DESCRIPTION OF THE EMBODIMENTS

Hereinafter, an adhered substance detection apparatus and an adhered substance detection method of an embodiment will be described in detail with reference to the drawings. The invention is not limited to the embodiment described below.

Figure 1A:
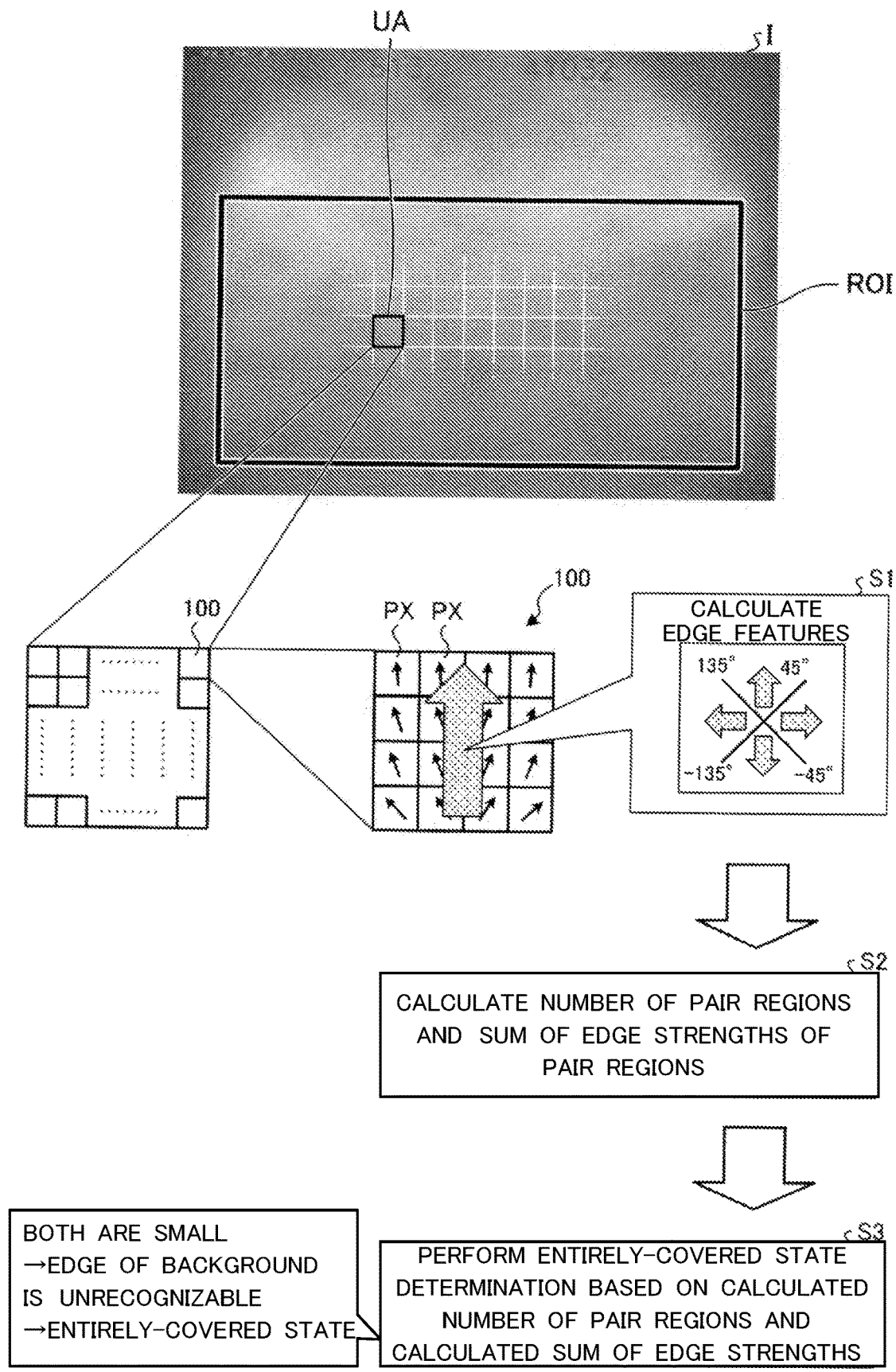
FIG. 1A illustrates an outline of an adhered substance detection method of the embodiment.
Figure 1B:
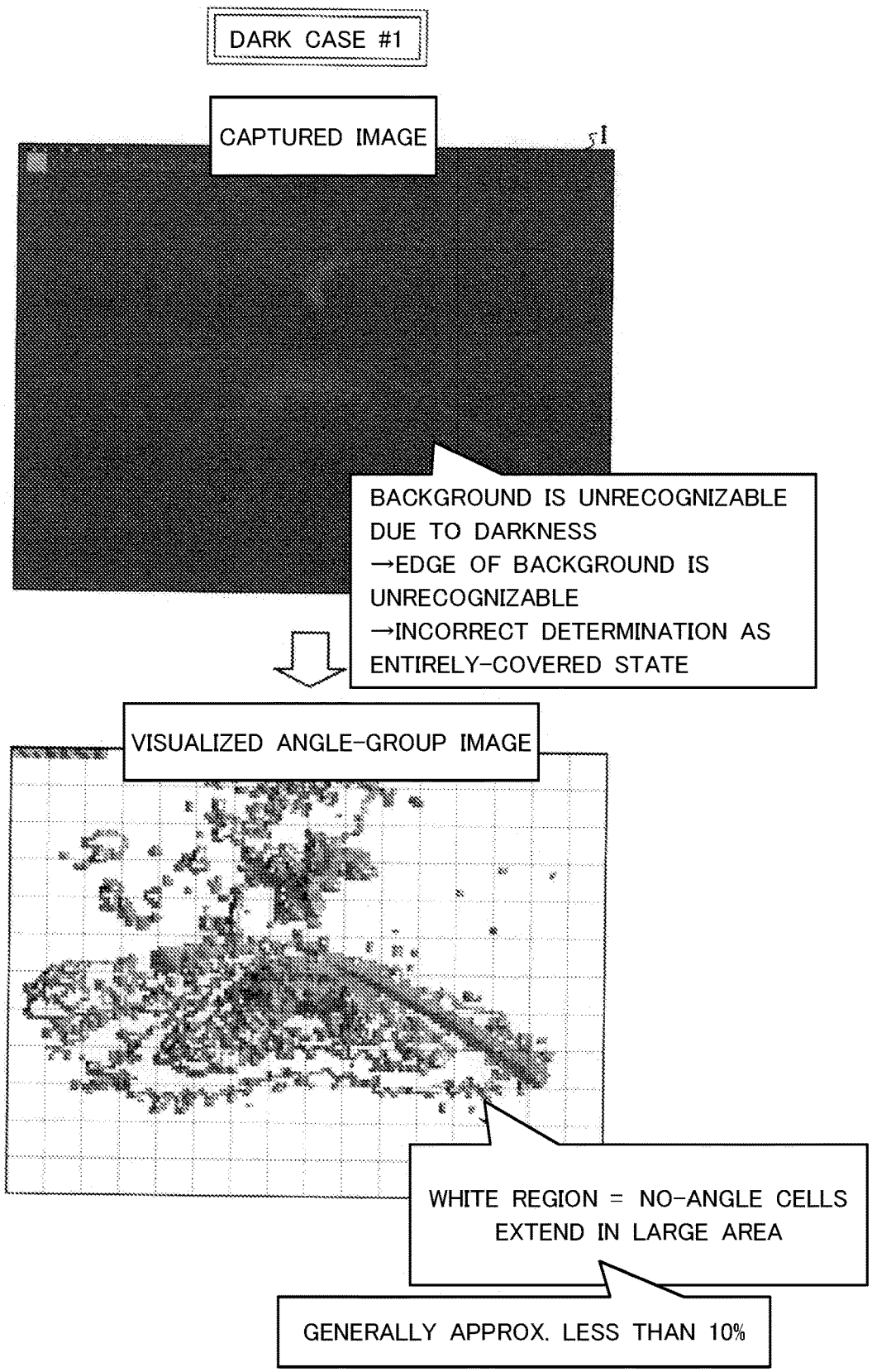
FIG. 1B illustrates an outline of the adhered substance detection method of the embodiment.
Figure 1C:
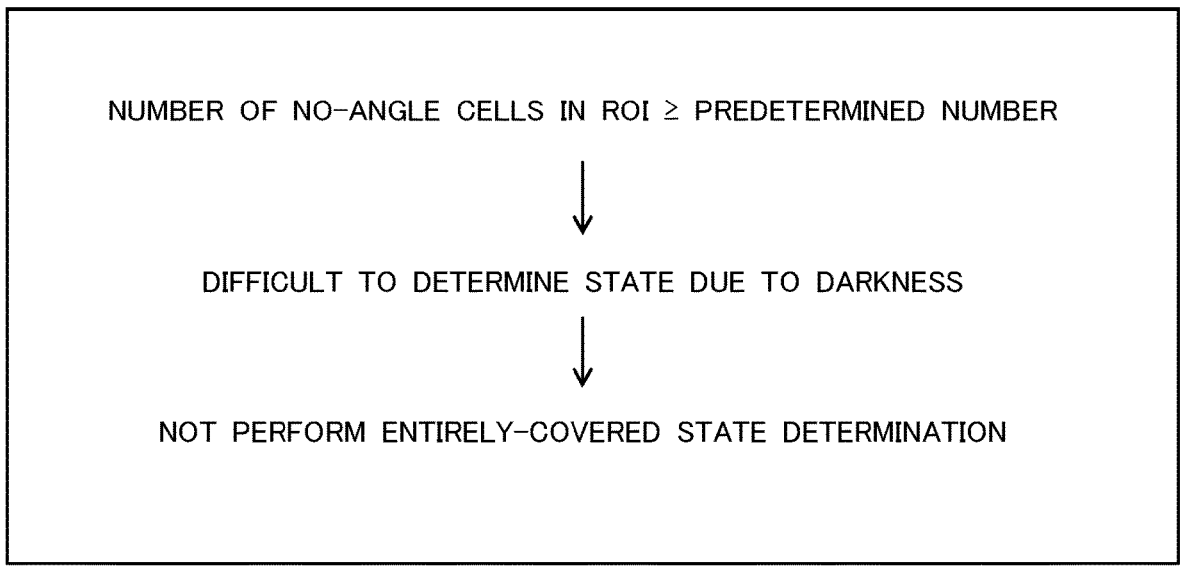
FIG. 1C illustrates an outline of the adhered substance detection method of the embodiment.

First, with reference to FIGS. 1A to 1C, an outline of the adhered substance detection method of the embodiment will be described. FIGS. 1A to 1C illustrate the outline of the adhered substance detection method of the embodiment.

As shown in FIG. 1A, for example, a captured image I is captured by a vehicle-mounted camera in a state in which snow is on a surface of a lens of the vehicle-mounted camera. As an example, below will be described a case in which an adhered substance detection apparatus 1 (see FIG. 2) using the adhered substance detection method of the embodiment detects a state in which the surface of the lens of the vehicle-mounted camera is entirely covered by snow (hereinafter referred to as "entirely-covered state"). The adhered substance detection apparatus 1 detects the entirely-covered state based on a feature (hereinafter referred to also as "edge feature") relating to a luminance gradient of each pixel of the captured image I.

More specifically, as shown in FIG. 1A, the adhered substance detection apparatus 1 calculates the edge features of pixels PX within a ROI (Region of Interest) that is a predetermined attention area in the captured image I and detects an adherence state of snow based on the calculated edge features of the pixels PX. The edge feature includes an angle feature and a strength feature. The angle feature is defined as a direction of an edge vector (luminance gradient) (hereinafter referred to also as "edge direction") of each pixel PX. The strength feature is defined as a size of the edge vector (hereinafter referred to also as "edge strength") of each pixel PX.

In order to reduce processing load in image processing, the adhered substance detection apparatus 1 uses the edge feature of a cell 100 that is a group of a predetermined number of the pixels PX. Thus, the processing load in the image processing can be reduced. The ROI consists of one or more unit regions UA each of which is a group of the cells 100.

Next, the adhered substance detection apparatus 1 calculates a region feature for each of the unit regions UA, based on the edge features extracted from the cells 100. In other word, the region feature is a statistical edge feature for each unit region UA. For example, the region feature includes number of pair regions and a sum of edge strengths of the pair regions. Here, "pair region" is defined as a pair of the cells 100 that are adjacent to each other and that have the edge directions opposite to each other. The adhered substance detection apparatus 1 performs an entirely-covered state determination based on the region feature.

More specifically, as shown in FIG. 1A, a predetermined number of the cells 100 are arranged in a vertical direction and in a horizontal direction in each of the unit regions UA in the captured image I. The adhered substance detection apparatus 1 first calculates the edge features of the cells 100 for each of the unit regions UA (a step S1). The edge feature means the edge direction and the edge strength, as described above.

An edge direction for each of the cells 100 is, as shown in FIG. 1A, a representative value for the directions of the edge vectors of the pixels PX within each of the cells 100. The edge direction of each of the cells 100 is identified as one of angle groups that have a predetermined angle range. In an example shown in FIG. 1A, the edge direction for each of the cells 100 is identified as one of up, down, left and right directions each of which has a 90-degree angle range. An edge strength for each of the cells 100 is a representative value for the strengths of the edge vectors of the pixels PX within each of the cells 100. A calculation process of the edge feature for each cell 100 will be described later in detail with reference to FIGS. 3 and 4.

Next, the adhered substance detection apparatus 1 calculates the region feature for each of the unit regions UA based on the edge features of the cells 100, calculated in the step S1, within each of the unit regions UA. Here, number of the pair regions described above and a sum of the edge strengths of the pair regions are calculated (a step S2).

Then, the adhered substance detection apparatus 1 performs the entirely-covered state determination based on the calculated number of the pair regions and the calculated sum of the edge strengths of the pair regions (a step S3). Here, generally, many pair regions tend to be located on a boundary (edge) of background of the captured image I or the pair regions on the edge of the background of the captured image I tend to have a strong feature.

Therefore, when the feature is equal to or smaller than a predetermined value, i.e., when both the number of the pair regions and the sum of the edge strengths of the pair regions are small, as shown in FIG. 1A, the adhered substance detection apparatus 1 determines that the edge of the background is unrecognizable (unclear) so that the surface of the lens of the vehicle-mounted camera is entirely covered.

One of similar states to the entirely-covered state is a dark situation, as shown in an upper drawing of FIG. 1B, such as night with no light nearby so that the background of the captured image I is unrecognizable (unclear) due to darkness (referred to also as "dark case No. 1"), but is not the entirely-covered state. In such a case, the edge in the background of the captured image I is unrecognizable. In other words, both number of the pair regions and a sum of the edge strengths of the pair regions are small. Thus, there is a possibility that the adhered substance detection apparatus 1 incorrectly determines the case as the entirely-covered state in the foregoing entirely-covered state determination.

Here, a lower drawing of FIG. 1B is an image showing the angle groups visualized in the captured image I (hereinafter referred to as "visualized angle-group image"). A white region extends in a large area in the visualized angle-group image.

The white region represents one or more cells having no angle (i.e., zero edge strength). The term "zero edge strength" does not have to mean an absolute zero angle, and may include a state in which an edge strength is within a predetermined range that is set, for example, in designing. It is known that the cells having no angle (hereinafter referred to as "no-angle cell(s)") generally account for approximately less than 10% of an image in a case other than the dark case No. 1. Thus, the adhered substance detection method of this embodiment utilizes the characteristic of the dark case No. 1 that can be acquired from the visualized angle-group image, to prevent an erroneous determination in detecting the entirely-covered state.

More specifically, as shown in FIG. 1C, when number of the no-angle cells in the ROI is equal to or greater than a predetermined number, the adhered substance detection method of the embodiment, determines not to perform the entirely-covered state determination because it is difficult to determine the entirely-covered state due to darkness.

Thus, according to the adhered substance detection method of the embodiment, it is possible to incorrectly determine such a state as the dark case No. 1, as the entirely-covered state. In other words, accuracy in detecting an adhered substance can be improved.

In the adhered substance detection method of this embodiment, a process of determining the entirely-covered state is performed for each frame of the captured image I. The process derives a determination result indicative of whether or not the processed frame is determined as the entirely-covered state (e.g. "1" or "−1"). However, as shown in FIG. 1C, when the entirely-covered state determination is not performed, the process derives a determination result other than "1" and "−1," for example, "0 (zero)" for the frame.

A similar state to the entirely-covered state is not limited to the dark case No. 1 shown in FIG. 1B. Another case similar state to the entirely-covered state, except the dark case No. 1, will be described later with reference to FIGS. 9A to 9D.

The below will be more specifically described a configuration example of the adhered substance detection apparatus 1 utilizing the foregoing adhered substance detection method of the embodiment.

Figure 2:
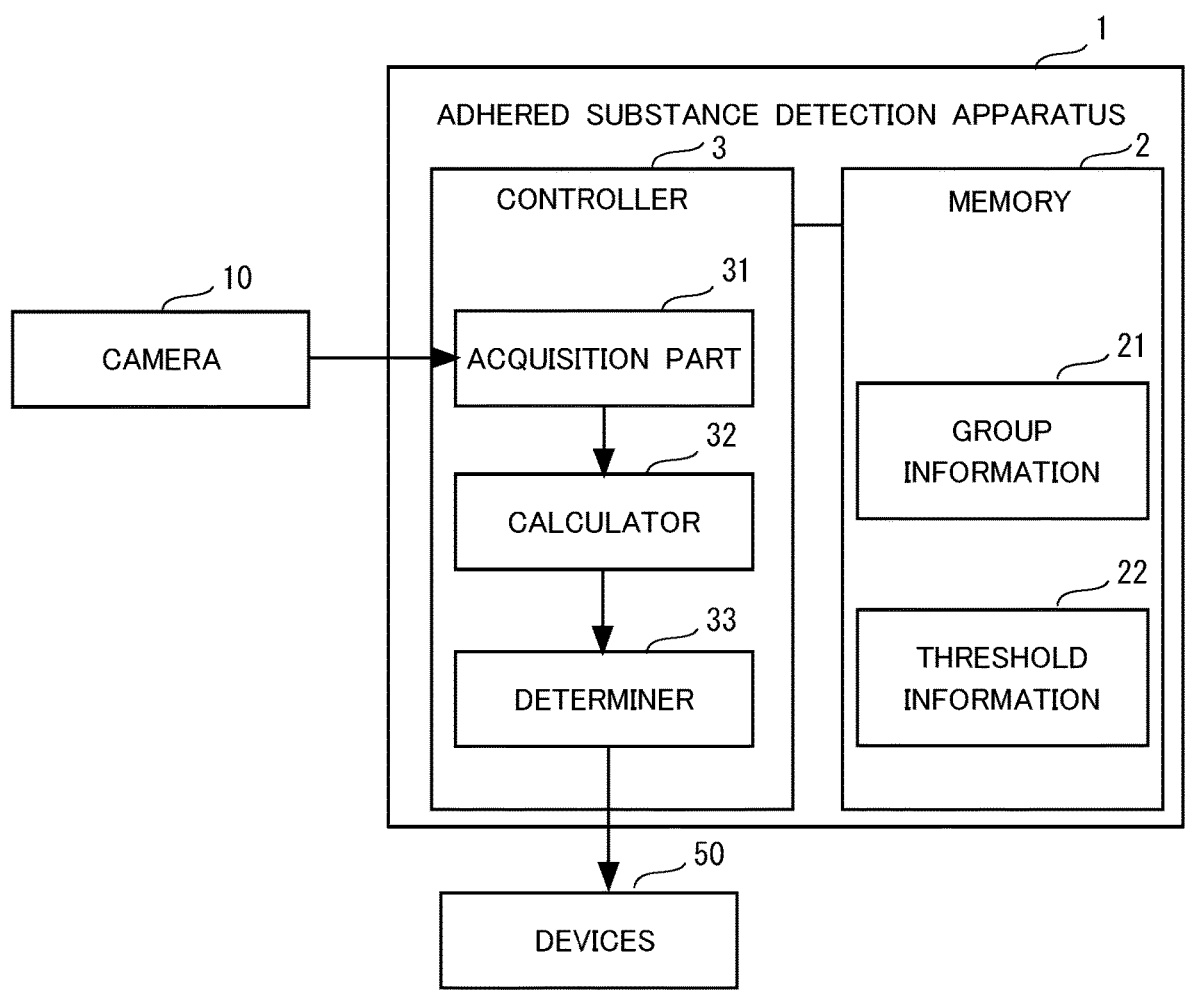
FIG. 2 is a block diagram of the adhered substance detection apparatus of the embodiment.

FIG. 2 is a block diagram of the adhered substance detection apparatus 1 of the embodiment. FIG. 2 illustrates the block diagram only including configuration elements necessary to explain a feature of this embodiment, and general configuration elements are omitted.

In other words, the configuration elements illustrated in FIG. 2 are functional concept, and are not necessarily physically configured as illustrated in FIG. 2. For example, a concrete configuration, such as separation and integration of functional blocks, is not limited to the configuration illustrated in FIG. 2. Some or all functional blocks of the adhered substance detection apparatus 1 may be functionally or physically separated or integrated into an appropriate unit, according to a load or a use situation of the functional blocks.

As illustrated in FIG. 2, the adhered substance detection apparatus 1 of the embodiment includes a memory 2 and a controller 3. The adhered substance detection apparatus 1 is connected to a camera 10 and various devices 50.

In FIG. 2, the adhered substance detection apparatus 1 is configured separately from the camera 10 and the various devices 50, but is not limited thereto. The adhered substance detection apparatus 1 may be configured as one unit with at least one of the camera 10 and the various devices 50.

The camera 10 is, for example, a vehicle-mounted camera including a lens, such as a fish-eye lens, and an imaging element, such as a CCD (Charge Coupled Device) and a CMOS (Complementary Metal Oxide Semiconductor). The camera 10 is, for example, provided at each position capable of capturing front, rear and side images of a vehicle, and outputs the captured image I to the adhered substance detection apparatus 1.

The various devices 50 acquire a detection result from the adhered substance detection apparatus 1 to perform various control of the vehicle. Some among the various devices 50 are a display that informs a user of an adhered substance on the lens of the camera 10 and instructs the user to remove the adhered substance from the lens, a removing device that removes the adhered substance from the lens by ejecting a fluid, air, etc. onto the lens, and a vehicle controller that controls autonomous driving.

The memory 2 is, for example, a semiconductor memory device, such as a RAM (Random Access Memory) and a flash memory, or a memory device, such as a hard disk or an optical disk. In an example shown in FIG. 2, the memory 2 stores group information 21 and threshold information 22.

The group information 21 is information relating to the foregoing angle groups. For example, the group information 21 includes the predetermined angle range for the angle groups, and the like. The threshold information 22 is information relating to a threshold that is used for a determination process that is performed by a determiner 33 described later. The threshold information 22 includes, for example, the predetermined number (threshold) for the no-angle cells shown in FIG. 1C, and the like.

The controller 3 is a CPU (Central Processing Unit) or an MPU (Micro Processing Unit), etc. that executes various programs stored in a memory in the adhered substance detection apparatus 1, using a RAM as a work area. The controller 3 may be an integrated circuit such as an ASIC (Application Specific Integrated Circuit) or an FPGA (Field Programmable Gate Array).

The controller 3 includes an acquisition part 31, a calculator 32 and the determiner 33. The controller 3 executes an information processing function and/or produces an effect described below.

The acquisition part 31 acquires the captured image I captured by the camera 10. The acquisition part 31 performs grayscale processing that converts luminance of pixels of the acquired captured image I into gray levels from white to black based on the luminance of the pixels of the captured image I, and also performs a smoothing process for the pixels of the captured image I. Then, the acquisition part 31 outputs the captured image I to the calculator 32. An arbitrary smoothing filter, such as an averaging filter and Gaussian filter may be used for the smoothing process. Further, the grayscale processing and/or the smoothing process may be omitted.

The calculator 32 calculates the edge feature for each of the cells 100 in the captured image I received from the acquisition part 31. Here will be described, with reference to FIGS. 3 and 4, the calculation process of the edge feature that is performed by the calculator 32.

Figure 3:
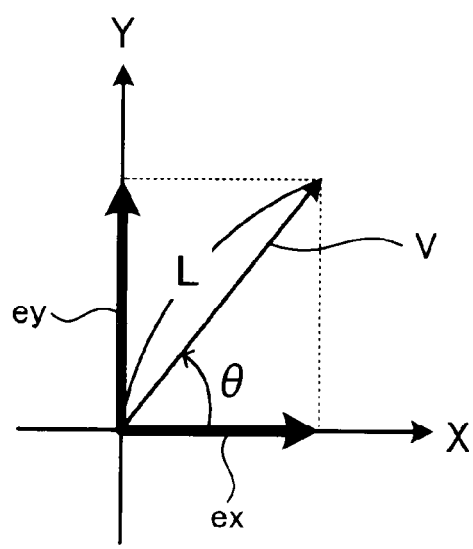
FIG. 3 illustrates a process of a calculator.
Figure 4:
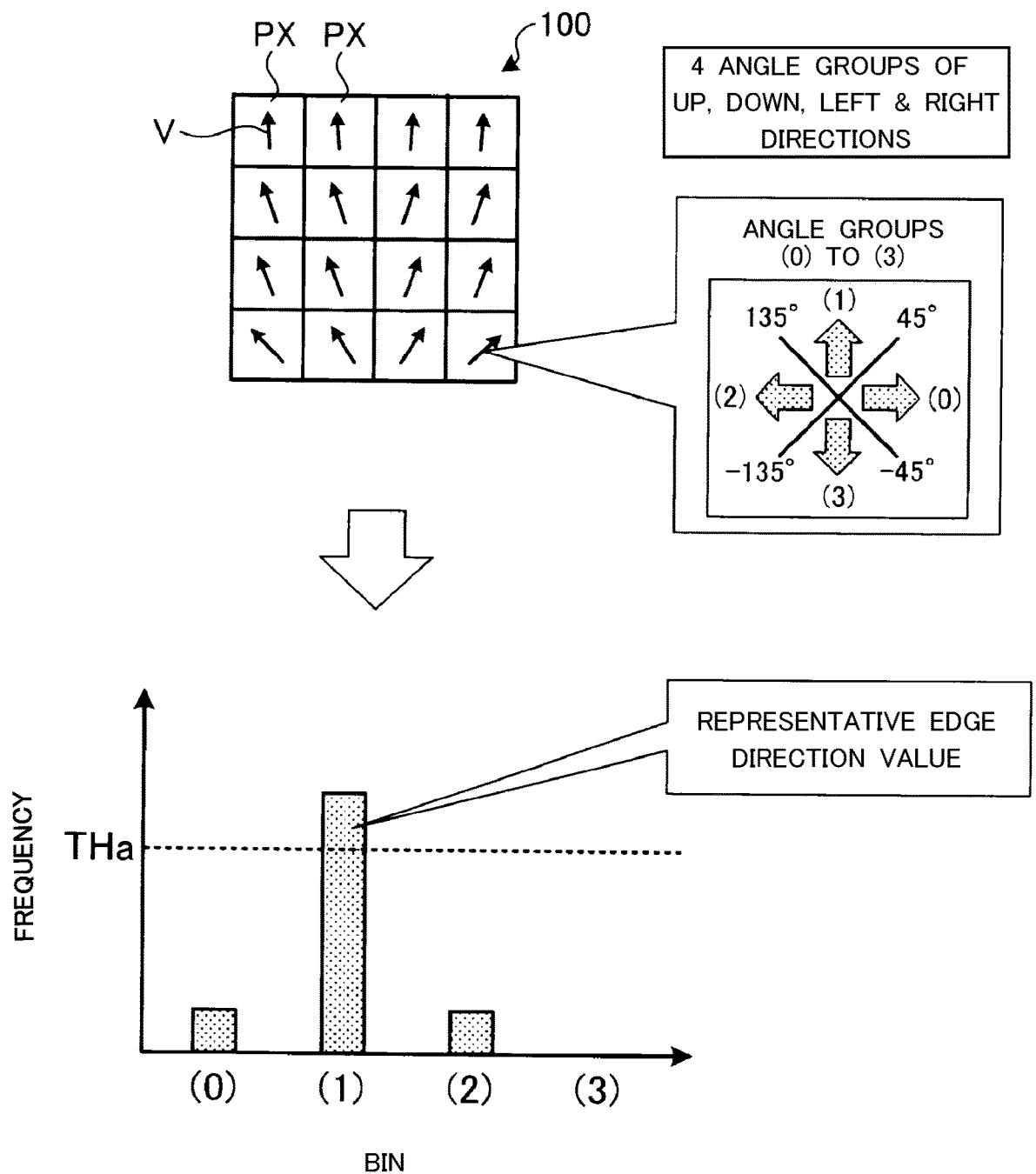
FIG. 4 illustrates the process of the calculator.

FIGS. 3 and 4 illustrate the calculation process that is performed by the calculator 32. As shown in FIG. 3, the calculator 32 first performs an edge detection process for each pixel PX to detect a strength of an edge ex in an X-axis direction (the horizontal direction of the captured image I) and a strength of an edge ey in a Y-axis direction (the vertical direction of the captured image I). For the edge detection process, an arbitrary edge detection filter, such as Sobel filter and Prewitt filter, may be used.

Next, the calculator 32 calculates an edge vector V based on the detected strengths of the edge ex and the edge ey in the X-axis direction and the Y-axis direction, using a trigonometric function. The calculator 32 calculates the edge direction that is an angle θ between the edge vector V and an X axis, and the edge strength that is a length L of the edge vector V.

Next, the calculator 32 calculates a representative edge direction value for each of the cells 100 based on the calculated edge vectors V of the pixels PX within each cell 100. More specifically, as shown in an upper drawing of FIG. 4, the calculator 32 categorizes the edge directions of the edge vectors V of the pixels PX within each cell 100 into four angle groups (0) to (3) in up, down, left and right directions. The four angle groups (0) to (3) are generated by dividing an edge direction range from −180° to 180° into the four up, down, left and right directions to have the 90-degree angle range each.

More specifically, among the edge directions of the edge vectors V of the pixels PX, an edge direction within an angle range from −45° to 45° is categorized as the angle group (0) by the calculator 32; an edge direction within an angle range from 45° to 135° is categorized as the angle group (1) by the calculator 32; an edge direction within an angle range from 135° to 180° or −180° to −135° is categorized as the angle group (2) by the calculator 32; and an edge direction within an angle range from −135° to −45° is categorized as the angle group (3) by the calculator 32.

Then, as shown in a lower drawing of FIG. 4, for each cell 100, the calculator 32 creates a histogram having bins of the angle groups (0) to (3). Then, when, among frequencies of the bins, a largest frequency is equal to or greater than a predetermined threshold THa, the calculator 32 derives the angle group corresponding to the bin having the largest frequency (in a case of FIG. 4, the angle group (1)), as the representative edge direction value for the cell 100.

A frequency of the histogram is calculated by summing the edge strengths of the pixels PX categorized into a same angle group, among the pixels PX within the cell 100. As a more specific example, when three pixels PX having the edge strengths 10, 20, and 30 respectively, are categorized in the angle group (0), a bin of the histogram, the frequency of the angle group (0) is 60 that is calculated by adding 10, 20 and 30 of the edge strengths.

Based on the histogram calculated in such a manner, the calculator 32 calculates a representative edge strength value for each cell 100. More specifically, when a frequency of the bin having the largest frequency in the histogram is equal to or greater than the predetermined threshold THa, the representative edge strength value of the cell 100 is the frequency of the bin having the largest frequency. In other words, a calculation process of the representative edge strength value performed by the calculator 32 is a calculation process that calculates a feature relating to the edge strengths corresponding to the representative edge direction value, within each cell 100.

Meanwhile, when the frequency of the bin having the largest frequency is smaller than the predetermined threshold THa, the calculator 32 regards the edge direction for the cell 100 as "invalid," in other words, "no representative edge direction value," i.e., "no angle" described above. Thus, when variation of the edge directions of the pixels PX is large, calculating an edge direction as a representative value is prevented.

The process in FIGS. 3 and 4 performed by the calculator 32 is only an example, and if a representative edge direction value can be calculated, any process may be performed. For example, the adhered substance detection apparatus 1 may calculate an average value of the edge directions of the pixels PX within each cell 100, and may identify one of the angle groups (0) to (3) corresponding to the average value as the representative edge direction value.

For example, in FIG. 4, the cell 100 is an area of 16 pixels PX that are arranged in a 4×4 matrix. However, number of the pixels PX in one cell 100 may be arbitrarily set. Further, number of the pixels PX arranged in the vertical direction may be different from number of the pixels PX arranged in the horizontal direction, such as a 3×5 matrix.

The calculator 32 in FIG. 2 calculates the region feature for each of the unit regions UA based on the calculated edge features of the cells 100.

More specifically, the calculator 32 calculates number of pair regions 200 and a sum of edge strengths of the pair regions 200 for each of the unit regions UA.

Figure 5:
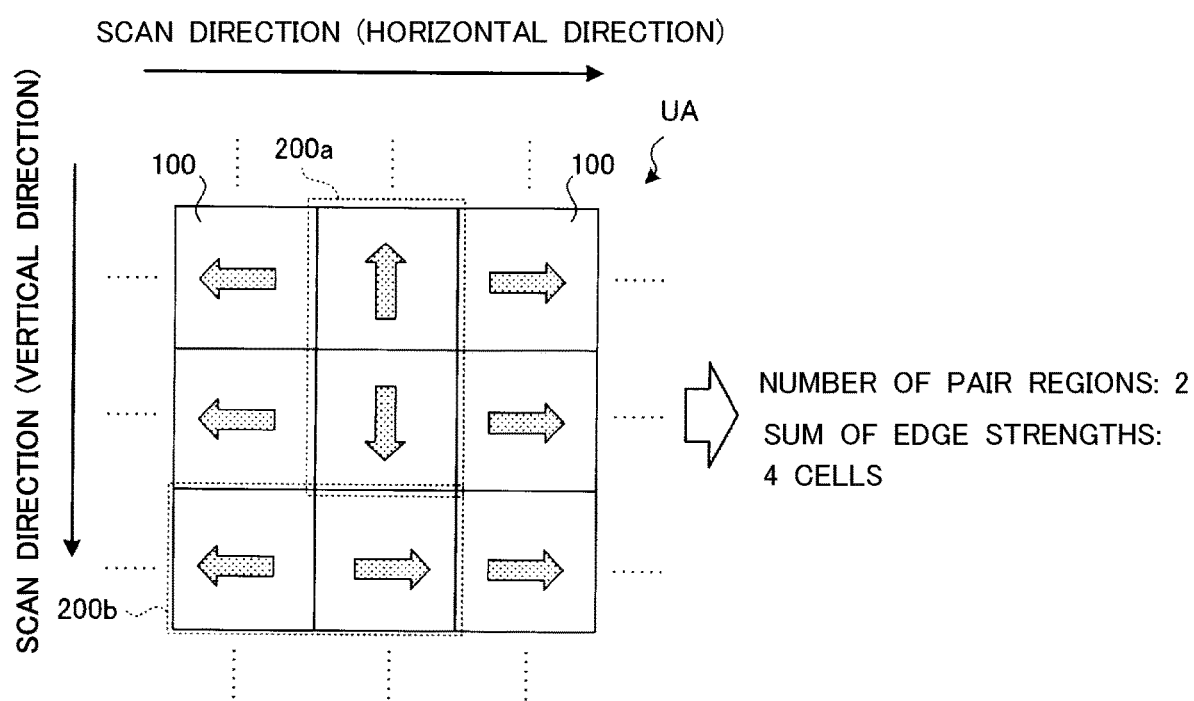
FIG. 5 illustrates the process of the calculator.
Figure 6:
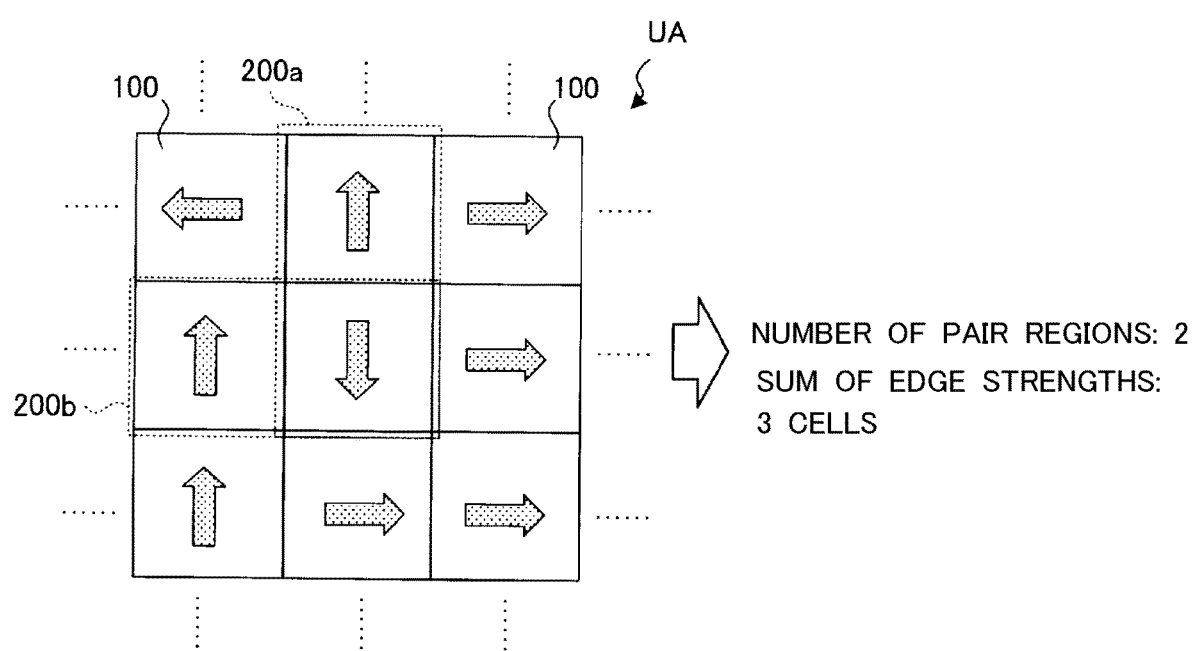
FIG. 6 illustrates the process of the calculator.

Here will be described, with reference to FIGS. 5 and 6, a calculation process, performed by the calculator 32, for the number of the pair regions 200 and the sum of the edge strengths for the pair regions 200. FIGS. 5 and 6 illustrate the calculation process that is performed by the calculator 32.

FIG. 5 illustrates a case in which two pair regions 200 share no cell 100, and FIG. 6 illustrates a case in which two pair regions 200 share one cell 100.

As shown in FIG. 5, the calculator 32 horizontally and vertically scans a plurality of the cells 100 arranged in the unit region UA in the horizontal direction and the vertical direction, to detect the pair region 200. In other words, the calculator 32 extracts, as the pair region 200, a pair of the cells 100 within the unit region UA that are adjacent to each other and that have the edge directions opposite to each other.

Then, the calculator 32 calculates the number of the extracted pair regions 200 and the sum of the edge strengths of the extracted pair regions 200. For example, when the extracted two pair regions 200 share no cell 100, as shown in FIG. 5, the calculator 32 determines that the calculated number of the extracted pair regions 200 is two and calculates a sum of the edge strengths of the four cells 100 included in the two pair regions 200 as the sum of the edge strengths of the extracted pair regions 200.

For example, when the extracted two pair regions 200 share one cell 100, as shown in FIG. 6, the calculator 32 determines that the calculated number of the extracted pair regions 200 is two and calculates a sum of the edge strengths of the three cells 100 included in the two pair regions 200 as the sum of the edge strengths of the extracted pair regions 200.

Figure 7:
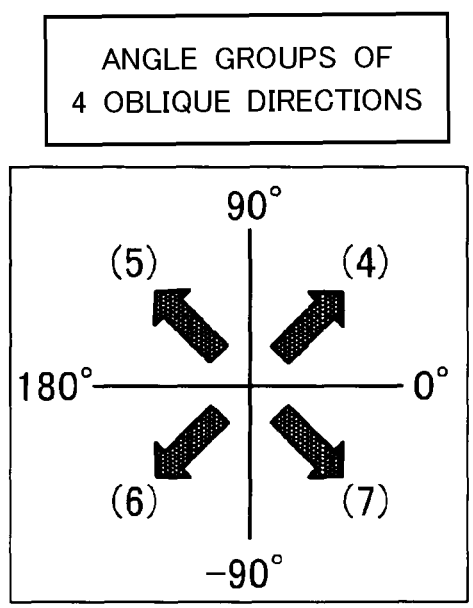
FIG. 7 illustrates a process of a calculator in a modification.
Figure 8:
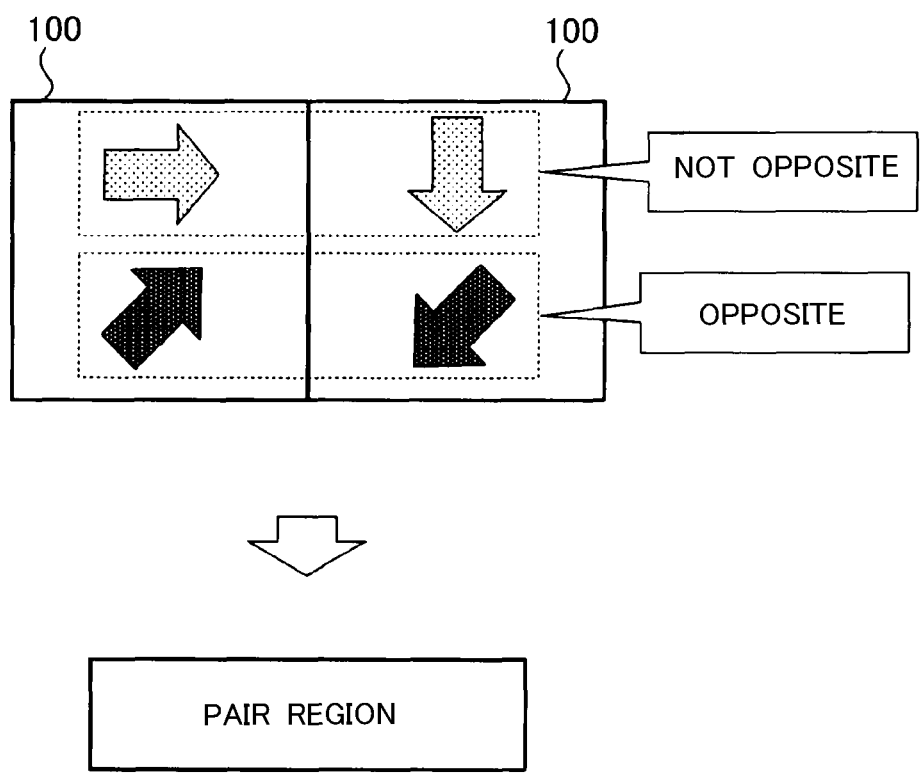
FIG. 8 illustrates the process of the calculator in the modification.

The calculator 32 may calculate two or more representative edge direction values for each of the cells 100 based on a plurality of types of the angle groups, not only the foregoing angle groups of the "four up, down, left and right directions" but also, for example, angle groups of "four oblique directions," to calculate the region feature. This will be described with reference to FIGS. 7 and 8. FIGS. 7 and 8 illustrate a process performed by the calculator 32 of a modification.

The calculator 32 calculates a first representative edge direction value based on the "four up, down, left and right directions" that are first angle groups. The calculator 32 also calculates a second representative edge direction value based on the "four oblique directions" that are second angle groups, as shown in FIG. 7.

In this case, the calculator 32 categorizes the edge directions of the edge vectors V of the pixels PX within each cell 100 into four angle groups (4) to (7) that are generated by dividing the angle range from −180° to 180° into the four oblique directions to have a 90-degree angle range each.

More specifically, among the edge directions of the edge vectors V of the pixels PX, an edge direction within an angle range from 0° to 90° is categorized as the angle group (4) by the calculator 32; an edge direction within an angle range from 90° to 180° is categorized as the angle group (5) by the calculator 32; an edge direction within an angle range from −180° to −90° is categorized as the angle group (6) by the calculator 32; and an edge direction within an angle range from −90° to 0° is categorized as the angle group (7) by the calculator 32.

As shown in the lower drawing of FIG. 4, for each cell 100, the calculator 32 creates a histogram having bins of the angle groups (4) to (7). When, among frequencies of the bins of the generated histogram, a largest frequency is equal to or greater than the predetermined threshold THa, the calculator 32 derives the angle group corresponding to the bin having the largest frequency, as the second representative edge direction value for the cell 100.

Thus, as shown in FIG. 8, the two representative edge direction values are calculated for each cell 100. Then, as shown in FIG. 8, the calculator 32 extracts, as the pair region 200, a pair of the cells 100 that are adjacent to each other and one of which has at least one of the first and second representative edge direction values opposite to one of the first and second representative edge direction values of the other.

In other words, since the calculator 32 calculates the first representative edge direction value and the second representative edge direction value for each cell 100, the calculator 32 can extract the pair region 200 that cannot be extracted when the calculator 32 only calculates one representative edge direction value for each cell 100.

For example, when the edge directions of the pixels PX are categorized into the first angle groups, an edge direction 140° is not opposite to an edge direction −40°. However, when the edge directions of the pixels PX are categorized into the second angle groups, those two edge directions are opposite to each other. Therefore, a change of the edge directions within each cell 100 can be detected more accurately.

With reference back to FIG. 2, the calculator 32 further calculates, as the region feature, number of the cells 100 having the edge strength, a part of the edge feature, of zero. In other words, the calculator 32 calculates number of the no-angle cells described above, an average luminance value, etc. Then the calculator 32 outputs, to the determiner 33, the calculated region feature for each unit region UA.

The determiner 33 performs the entirely-covered state determination based on the region feature calculated by the calculator 32, i.e., the number of the pair regions 200 and the sum of the edge strengths in the pair regions 200.

However, as shown in FIG. 1C, when the number of the no-angle cells is equal to or greater than the predetermined number in the ROI, i.e., when the image satisfies a condition of the dark case No. 1, the determiner 33 determines not to perform the entirely-covered state determination because it is difficult to determine the entirely-covered state due to darkness.

When a state is not the dark case No. 1 but is similar to the entirely-covered state, the determiner 33 may perform a process to prevent an incorrect determination. FIGS. 9A to 9D illustrate the process performed by the determiner 33. The dark case No. 1 is already described above so that another case will be described with reference to FIGS. 9A to 9D.

First, a dark case No. 2 will be described with reference to FIGS. 9A to 9B. As shown in an upper drawing of FIG.

9A, the dark case No. 2 is a case of insufficient illumination that causes the background of the captured image I to be unclear; however, a dark region in the captured image I in the dark case No. 2 is not large as compared to the dark case No. 1, because, for example, surroundings of the vehicle are slightly lit by a brake light and the like of the vehicle.

Figure 9A:
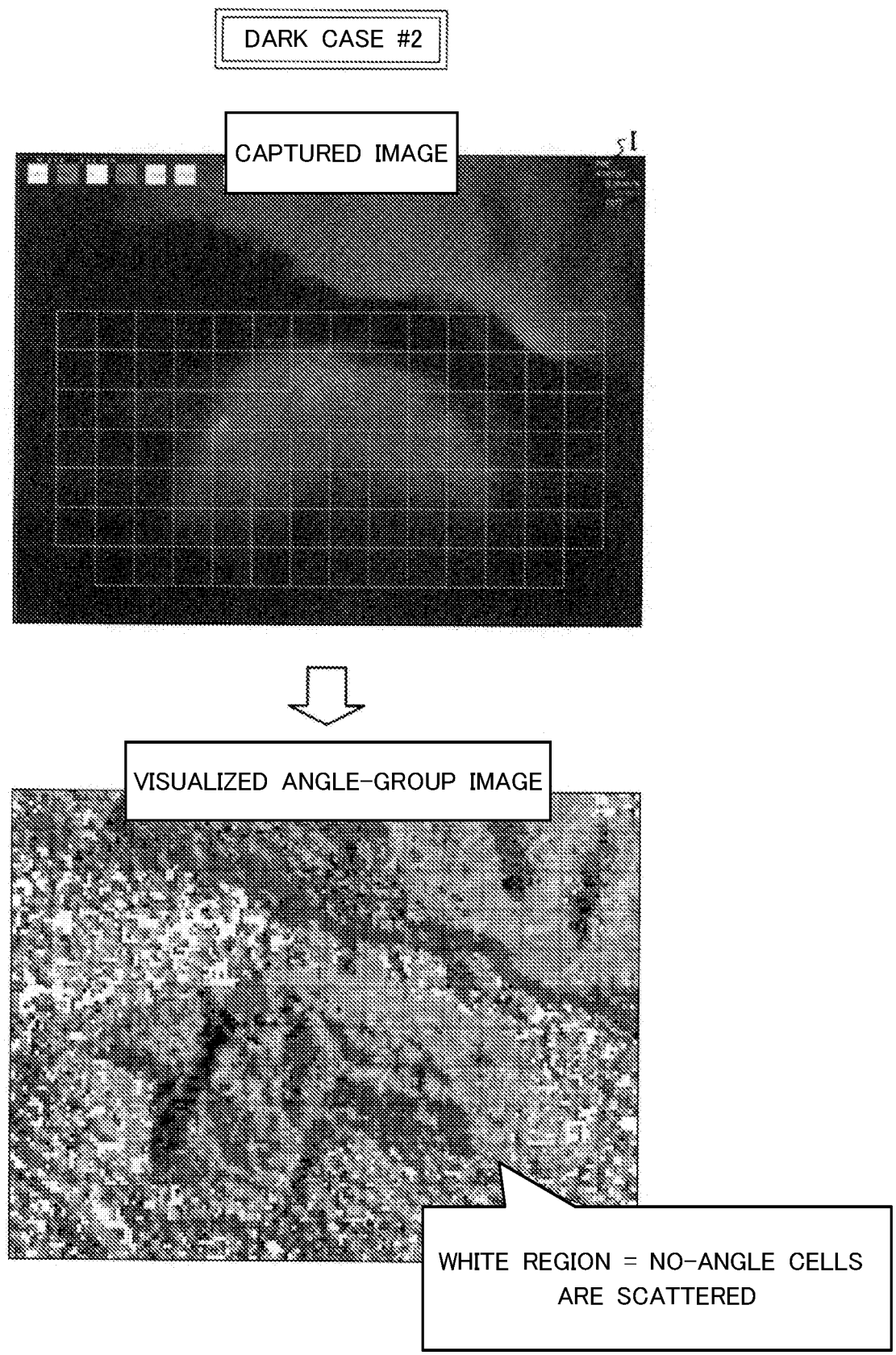
FIG. 9A illustrates a process of a determiner.

Here, a lower drawing of FIG. 9A illustrates a visualized angle-group image of the captured image I in the dark case No. 2. In the visualized angle-group image, the white (no-angle) cells do not extend in a large area in the captured image I as compared to the dark case No. 1. However, the no-angle cells are scattered in the dark region of the captured image I.

The determiner 33 uses the feature of the dark case No. 2 that is acquired from the visualized angle-group image to prevent an incorrect determination in the entirely-covered state determination.

Figure 9B:
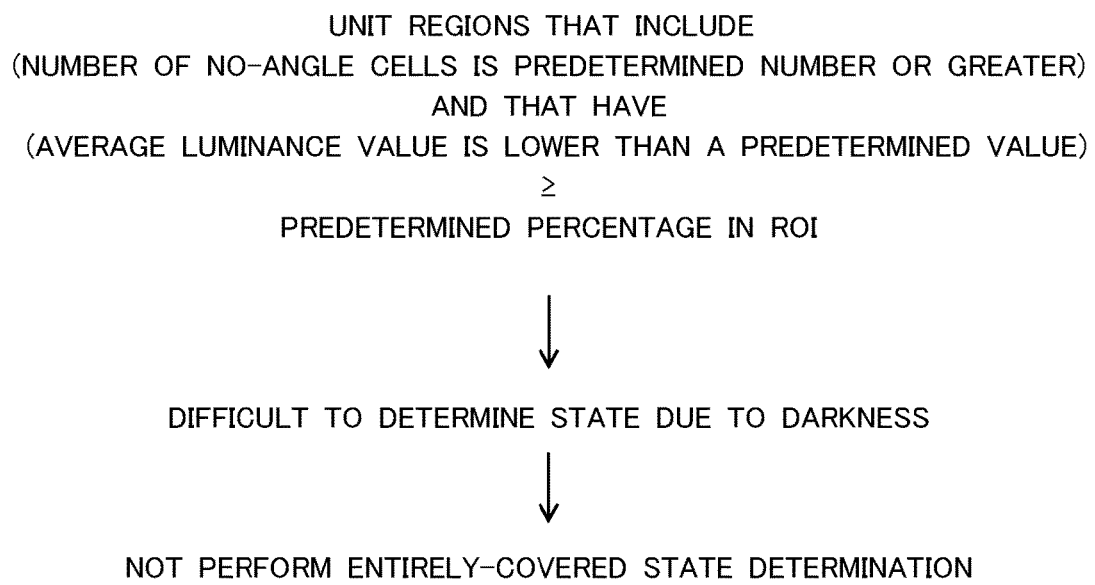
FIG. 9B illustrates the process of the determiner.

More specifically, as shown in FIG. 9B, when the unit regions UA satisfying a condition below account for a predetermined percentage or greater in the ROI, the determiner 33 determines not to perform the entirely-covered state determination because it is difficult to determine the entirely-covered state due to darkness, like the dark case No. 1. The condition is that the unit regions UA i) include a predetermined number or a greater number of the no-angle cells and ii) have an average luminance value lower than a predetermined value. In other words, when the unit regions UA that i) include the predetermined number or a greater number of the no-angle cells and ii) have an average luminance value lower than the predetermined value, account for the predetermined percentage or greater in the ROI, the determiner 33 determines not to perform the entirely-covered state determination.

Thus, it is possible to prevent from incorrectly determining such a state as the dark case No. 2, as the entirely-covered state. In other words, accuracy in detecting an adhered substance can be improved.

Being similar to the dark case No. 1, in the dark case No. 2, the determiner 33 does not perform the entirely-covered state so that the determiner 33 derives "0" as the determination result.

Next, a dark case No. 3 will be described with reference to FIGS. 9C to 9D. As shown in an upper drawing of FIG. 9C, the dark case No. 3 is a case of a blurred edge of the background of the captured image I because, for example, the captured image I was captured by a rear camera at night, having snow melting agent or the like on the lens that causes the captured image I to be entirely blurred and a portion of a bumper of the vehicle in the captured image I to be whited out by a light of the vehicle.

When the lens is entirely covered by snow, an upper portion of an image may be bright, for example, by lights in a tunnel. However, when the lens is entirely covered by snow, an image of which a lower portion is bright is seldom captured because such an image is captured, for example, when the lens is lit from a road surface.

The determiner 33 uses the feature of the dark case No. 3 to prevent an incorrect determination in the entirely-covered state determination based on a difference in average luminance value between an ROI_U and an ROI_D that are defined in an upper portion and a lower portion of an image, respectively.

Figure 9C:
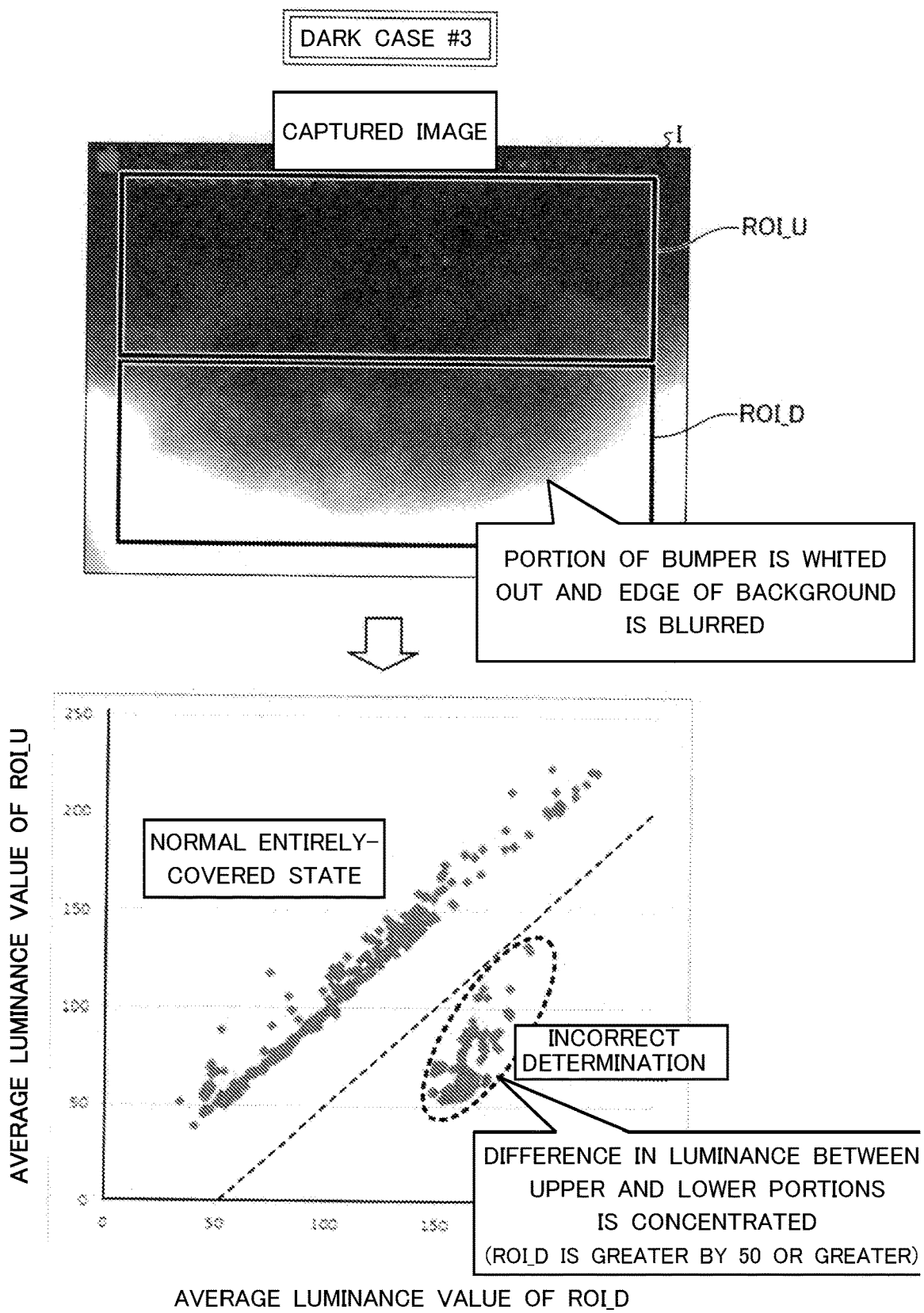
FIG. 9C illustrates the process of the determiner.

A lower drawing of FIG. 9C is a correlation chart having a Y-axis representing the average luminance value of the upper portion ROI_U of the captured image I and an X-axis representing the average luminance value of the lower portion ROI_D of the captured image I.

According to the correlation chart, when such a state as the dark case No. 3 is incorrectly determined as the entirely-covered state, luminance of the upper portion and luminance of the lower portion in the image are disproportionate so that the difference in luminance between the upper portion and the lower portion is concentrated and has a tendency that the luminance of the lower portion ROI_D is greater than the luminance of the upper portion ROI_U by 50 or greater (i.e., the luminance is located below a dotted line in the chart).

Figure 9D:
FIG. 9D illustrates the process of the determiner.

Therefore, as shown in FIG. 9D, when the average luminance value of the lower portion ROI_D is greater than the average luminance value of the upper portion ROI_U by a predetermined value or greater (50 or greater in the example shown in FIG. 9C), the determiner 33 determines that the lens of the camera 10 is not in the entirely-covered state. In other words, the determiner 33 derives a determination result "−1."

Thus, it is possible to prevent from incorrectly determining such a state as the dark case No. 3, as the entirely-covered state. In other words, accuracy in detecting an adhered substance can be improved.

With reference back to FIG. 2, the determiner 33 outputs the determination result of the determination to the various devices 50.

Figure 10:
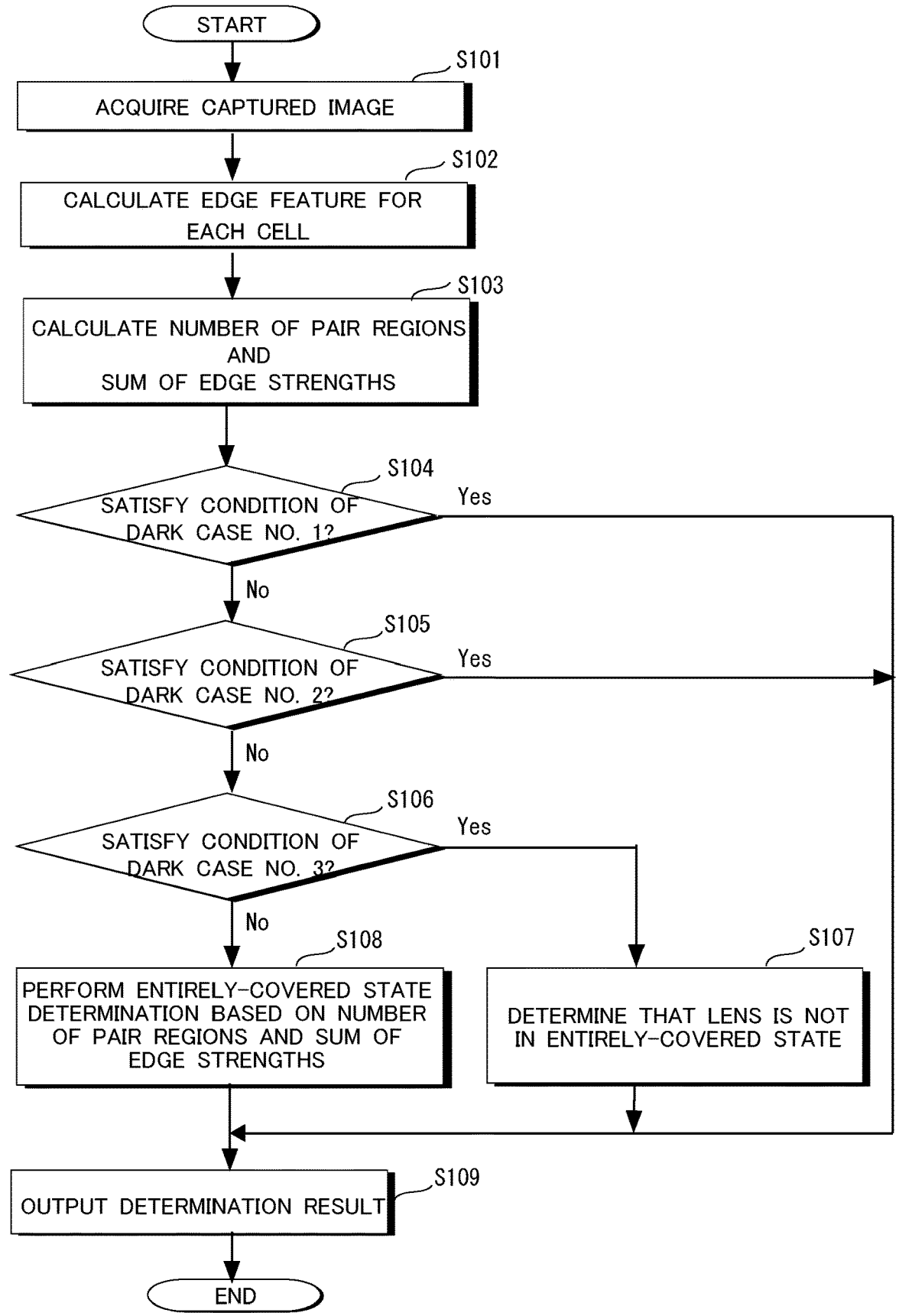
FIG. 10 is a flowchart illustrating a procedure of the process that is performed by the adhered substance detection apparatus of the embodiment.

Next will be described is a procedure of the process that is performed by the adhered substance detection apparatus 1 of the embodiment, with reference to FIG. 10. FIG. 10 is a flowchart illustrating the procedure of the process that is performed by the adhered substance detection apparatus 1 of the embodiment. FIG. 10 illustrates the procedure of the process that is performed for each frame of the captured image I.

As shown in FIG. 10, first the acquisition part 31 acquires the captured image I (a step S101). The acquisition part 31 performs the grayscale processing and the smoothing process for the captured image I.

Next, the calculator 32 calculates the edge feature for each of the cells 100 of the captured image I (a step S102). Further, the calculator 32 calculates the region feature for each of the unit regions UA based on the calculated edge features of the cells (a step S103).

Then, the determiner 33 determines, based on the region feature calculated by the calculator 32, whether or not the captured image I satisfies the condition of the dark case No. 1 (a step S104). When the captured image I satisfies the condition of the dark case No. 1 (Yes in the step S104), the determiner 33 derives, for example, "0 (zero)" as the determination result and moves to a step S109 without performing the entirely-covered state determination.

When the captured image I does not satisfy the condition of the dark case No. 1 (No in the step S104), the determiner 33 next determines whether or not the captured image I satisfies the condition of the dark case No. 2 (a step S105). When the captured image I satisfies the condition of the dark case No. 2 (Yes in the step S105), the determiner 33 derives, for example, "0 (zero)" as the determination result and moves to the step S109 without performing the entirely-covered state determination.

When the captured image I does not satisfy the condition of the dark case No. 2 (No in the step S105), the determiner 33 determines whether or not the captured image I satisfies the condition of the dark case No. 3 (a step S106). When the captured image I satisfies the condition of the dark case No. 3 (Yes in the step S106), the determiner 33 determines that the lens of the camera 10 is not in the entirely-covered state (a step S107). Then, the determiner 33 derives, for example, "−1" as the determination result.

When the captured image I does not satisfy the condition of the dark case No. 3 (No in the step S106), the determiner 33 performs the entirely-covered state determination based on the number of the pair regions and the sum of the edge strengths of the pair regions calculated by the calculator 32 (a step S108).

Then, the determiner 33 outputs the determination result to the various devices 50 (the step S109) and ends the process.

As described above, the adhered substance detection apparatus 1 of the embodiment includes the calculator 32 and the determiner 33. Each of the cell 100 consists of the predetermined number of the pixels PX in the captured image I. Based on the edge vectors of the predetermined number of the pixels PX within each of the cells 100, the calculator 32 calculates the edge feature for each of the cells 100. Further, each of the unit regions UA, a predetermined region, consists of the predetermined number of the cells 100. Based on the calculated edge features of the cells 100 within each of the unit regions UA, the calculator 32 calculates the region feature for each of the unit regions UA. The determiner 33 determines, based on the region feature, a state of an adhered substance on the lens of the camera 10. The calculator 32 calculates, as the region feature, number of the cells 100 having the edge strength, a part of the edge feature, of zero. Further, when the number of the cells 100 having the zero edge strength (no angle) is equal to or greater than the predetermined number in the ROI in the captured image I, the determiner 33 determines not to perform the entirely-covered state determination for detecting whether or not the lens of the camera 10 is in the entirely-covered state.

Thus, accuracy in detecting an adhered substance can be improved by the adhered substance detection apparatus 1 of the embodiment. Especially, in a case of the foregoing dark case No. 1, an incorrect determination can be prevented.

Further, the calculator 32 calculates the average luminance value as the region feature. When the unit regions UA that i) include the predetermined number or a greater number of the no-angle cells and ii) have an average luminance value lower than the predetermined value, account for the predetermined percentage or greater in the ROI, the determiner 33 determines not to perform the entirely-covered state determination.

Thus, accuracy in detecting an adhered substance can be improved by the adhered substance detection apparatus 1 of the embodiment. Especially, an incorrect determination can be prevented in the foregoing dark case No. 2.

Further, when the average luminance value of the ROI_D defined in the lower portion of the captured image I is greater than the average luminance value of the ROI_U defined in the upper portion of the captured image I by a predetermined value or greater, the determiner 33 determines that the lens of the camera 10 is not in the entirely-covered state.

Thus, accuracy in detecting an adhered substance can be improved by the adhered substance detection apparatus 1 of the embodiment. Especially, an incorrect determination can be prevented in the foregoing dark case No. 3.

The foregoing embodiment describes an example in which the calculator 32 categorizes the edge directions into the four angle groups that is generated by dividing the edge direction range from −180° to 180° into the four directions, to have a 90-degree angle range each. However, the angle range that the angle groups have is not limited to 90°. The edge direction range from −180° to 180° may be divided, for example, into six angle groups to have a 60-degree angle range each.

Further, the angle range for the first angle groups may be different from the angle range for the second angle groups. For example, the first angle groups may have a 90-degree angle range, and the second angle groups may have a 60-degree angle range. Further, lines dividing the second angle groups are displaced by 45° from lines dividing the first angle groups. However, the displaced angle may be greater or smaller than 45°.

The captured image I in the foregoing embodiment is, for example, an image captured by a vehicle-mounted camera. However, the captured image I may be an image captured by, for example, a security camera, a camera installed on a street light or the like The captured image I may be any image captured by a camera having a lens on which a substance may be adhered.

Further effects and modifications may be derived easily by a person skilled in the art. Thus, broader modes of the present invention may not be limited to the description and typical embodiment described above.

While the invention has been shown and described in detail, the foregoing description is in all aspects illustrative and not restrictive. It is therefore understood that numerous other modifications and variations can be devised without departing from the scope of the invention that is defined by the attached claims and equivalents thereof.

What is claimed is:

1. An adhered substance detection apparatus comprising a controller configured to function as:
   a calculator that calculates an edge feature for each cell of a plurality of cells of a captured image photographed by a camera, each of the cells having a plurality of pixels, the plurality of cells being arranged in a plurality of unit regions, each of the unit regions having a plurality of the cells, the edge feature of each of the cells being calculated based on edge vectors of the pixels within the cell, the calculator further calculating a region feature for each of the unit regions based on the calculated edge features of the cells within the unit region; and
   a determiner that determines an adherence state of an adhered substance on a lens of the camera based on the region features calculated for the unit regions; wherein
   the calculator calculates, as the region feature, a number of the cells having an edge strength of zero, the edge strength being a part of the edge feature; and
   when the number of the cells having the edge strength of zero is equal to or greater than a predetermined number in a predetermined attention area in the captured image, the determiner determines not to perform a determination for detecting whether or not the lens of the camera is in an entirely-covered state in which the lens of the camera is entirely covered by the adhered substance.

2. The adhered substance detection apparatus according to claim 1, wherein
   the calculator calculates an average luminance value for each of the unit regions, and
   when the unit regions that i) include at least the predetermined number of the cells having the edge strength of zero and ii) have the calculated average luminance value lower than a predetermined value, account for at least a predetermined percentage of the predetermined attention area, the determiner determines not to perform the determination for detecting whether or not the lens of the camera is in the entirely-covered state.

3. The adhered substance detection apparatus according to claim 2, wherein
when the average luminance value of a first predetermined attention area that is defined in a lower portion of the captured image is greater than the average luminance value of a second predetermined attention area that is defined in an upper portion of the captured image by at least a predetermined value, the determiner determines that the lens of the camera is not in the entirely-covered state.

4. An adhered substance detection method, comprising the steps of:
(a) calculating, by a controller, an edge feature for each cell of a plurality of cells of a captured image photographed by a camera, each of the cells having a plurality of pixels, the plurality of cells being arranged in a plurality of unit regions, each of the unit regions having a plurality of the cells, the edge feature of each of the cells being calculated based on edge vectors of the pixels within the cell, and further calculating, by the controller, a region feature for each of the unit regions based on the calculated edge features of the cells within the unit region; and
(b) determining, by the controller, an adherence state of an adhered substance on a lens of the camera based on the region features calculated for the unit regions; wherein
the step (a) calculates as the region feature, a number of the cells having an edge strength of zero, the edge strength being a part of the edge feature; and
when the number of the cells having the edge strength of zero is equal to or greater than a predetermined number in a predetermined attention area in the captured image, the step (b) determines not to perform a determination for detecting whether or not the lens of the camera is in an entirely-covered state in which the lens of the camera is entirely covered by the adhered substance.

* * * * *